(12) United States Patent
Modani et al.

(10) Patent No.: US 11,868,714 B2
(45) Date of Patent: Jan. 9, 2024

(54) FACILITATING GENERATION OF FILLABLE DOCUMENT TEMPLATES

(71) Applicant: ADOBE INC., San Jose, CA (US)

(72) Inventors: Natwar Modani, Karnataka (IN); Muskan Agarwal, Uttar Pradesh (IN); Vishesh Kaushik, Tamil Nadu (IN); Aparna Garimella, Telangana (IN); Akhash N A, Tamil Nadu (IN); Garvit Bhardwaj, Rajasthan (IN); Manoj Kilaru, Powai Mumbai (IN); Priyanshu Agarwal, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/682,911

(22) Filed: Feb. 28, 2022

(65) Prior Publication Data
US 2023/0274084 A1    Aug. 31, 2023

(51) Int. Cl.
*G06F 17/00*      (2019.01)
*G06F 40/186*     (2020.01)
*G06F 40/284*     (2020.01)

(52) U.S. Cl.
CPC .......... *G06F 40/186* (2020.01); *G06F 40/284* (2020.01)

(58) Field of Classification Search
CPC .............................. G06F 40/186; G06F 40/284
See application file for complete search history.

(56) References Cited

U.S. PATENT DOCUMENTS

| 2006/0103588 | A1* | 5/2006 | Chrisop | G03G 15/5091 |
| | | | | 345/2.1 |
| 2007/0101253 | A1* | 5/2007 | Bohle | G06F 40/174 |
| | | | | 707/999.001 |
| 2012/0066197 | A1* | 3/2012 | Rana | G06F 16/93 |
| | | | | 707/706 |

(Continued)

FOREIGN PATENT DOCUMENTS

| CN | 102411501 A | * | 4/2012 | ............. G06F 40/18 |
| CN | 103699482 A | * | 4/2014 | |

(Continued)

OTHER PUBLICATIONS

"A Dataset of Legal Contracts With Rich Expert Annotations", Contract Understanding Atticus Dataset (CUAD), Retrieved from Internet URL : https://www.atticusprojectai.org/cuad, accessed on Jul. 28, 2022, pp. 2.

(Continued)

*Primary Examiner* — Hassan Mrabi
(74) *Attorney, Agent, or Firm* — Shook, Hardy & Bacon L.L.P.

(57) ABSTRACT

Methods and systems are provided for facilitating generation of fillable document templates. In embodiments, a document having a plurality of tokens is obtained. Using a machine learned model, a token state is identified for each token of the plurality of tokens. Each token state indicates whether a corresponding token is a static token that is to be included in a fillable document template or a dynamic token that is to be excluded in the fillable document template. Thereafter, a fillable document template corresponding with the document is generated, wherein for each dynamic token of the document, the fillable document template includes a fillable field corresponding to the respective dynamic token.

17 Claims, 7 Drawing Sheets

(56) References Cited

U.S. PATENT DOCUMENTS

| | | | |
|---|---|---|---|
| 2013/0159840 A1* | 6/2013 | Nicolaescu | G06F 40/186 |
| | | | 715/235 |
| 2018/0081868 A1* | 3/2018 | Willcock | G06F 40/177 |
| 2019/0171542 A1* | 6/2019 | Lackner | G06F 11/3006 |
| 2019/0205369 A1* | 7/2019 | Iseri | G06F 40/174 |
| 2020/0057801 A1* | 2/2020 | Roy | G06F 40/174 |
| 2021/0124919 A1* | 4/2021 | Balakrishnan | G06V 10/751 |
| 2021/0174109 A1* | 6/2021 | Beller | G06V 30/416 |
| 2022/0130163 A1* | 4/2022 | Kumar | G06F 16/93 |

FOREIGN PATENT DOCUMENTS

| | | | | | |
|---|---|---|---|---|---|
| CN | 106815184 A | * | 6/2017 | | |
| CN | 109783751 A | * | 5/2019 | | |
| CN | 106815184 B | * | 7/2020 | | G06F 40/18 |
| CN | 114386374 A | * | 4/2022 | | |

OTHER PUBLICATIONS

"Legal-BERT-Base-Uncased", Hugging Face, Retrieved from Internet URL: https://huggingface.co/nlpaueb/legal-bert-base-uncased, accessed on May 15, 2022, pp. 1-9.

Chalkidis, I., et al., "Legal-BERT: the Muppets Straight Out of Law School", Department of Informatics, Retrived from Internet URL : https://arxiv.org/abs/2010.02559, pp. 1-7 (Oct. 6, 2020).

Devlin, J., et al., "BERT: Pre-Training of Deep Bidirectional Transformers for Language Understanding", In Proceedings of NAACL, pp. 1-16 (2019).

Liu, Y., et al., "ROBERTA: a Robustly Optimized BERT Pretraining Approach", arXiv abs/1907.11692v1, pp. 1-13 (Jul. 26, 2019).

Weischedel, R., et al., "Ontonotes Release 5.0", Linguistic Data Consortium, Retrieved from Internet URL : https://catalog.ldc.upenn.edu/LDC2013T19, accessed on May 15, 2022, pp. 1-2.

* cited by examiner

FACILITATING GENERATION OF FILLABLE DOCUMENT TEMPLATES

BACKGROUND

Generating legal documents, such as contracts, can be very tedious and time consuming. In particular, a legal document is generally created with precise language desired by one or more parties. As language used in legal documents is critically important, such document creation can be time intensive and financially burdensome. Accordingly, an individual or business may search for a suitable example contract to use as a starting point. Using an example contract as starting point, however, requires a very careful review of the document to ensure identification of each value that has been filled and to remove those values to create a document that can be filled. Further, such example contracts may not be easily editable (e.g., based on a document format).

SUMMARY

Embodiments described herein are directed to facilitating automatic generation of fillable document templates. In this regard, a template for a document, such as a legal document (e.g., a contract), can be automatically generated with fillable fields or regions such that a user can input text into the fillable regions to complete or create a desired document. In particular, dynamic tokens (e.g., words) that are particular to a specific instance of a document are automatically identified and removed from the existing document such that a user may provide user input into a fillable portion that replaces the identified dynamic tokens. As described herein, generating fillable document templates is performed in an efficient and effective manner using a machine learned model. In various embodiments, to train such a machine learned model, a collection of existing contracts is analyzed to train the model in an unsupervised manner, that is, without any human-labeled data.

DETAILED DESCRIPTION

Figure 1:
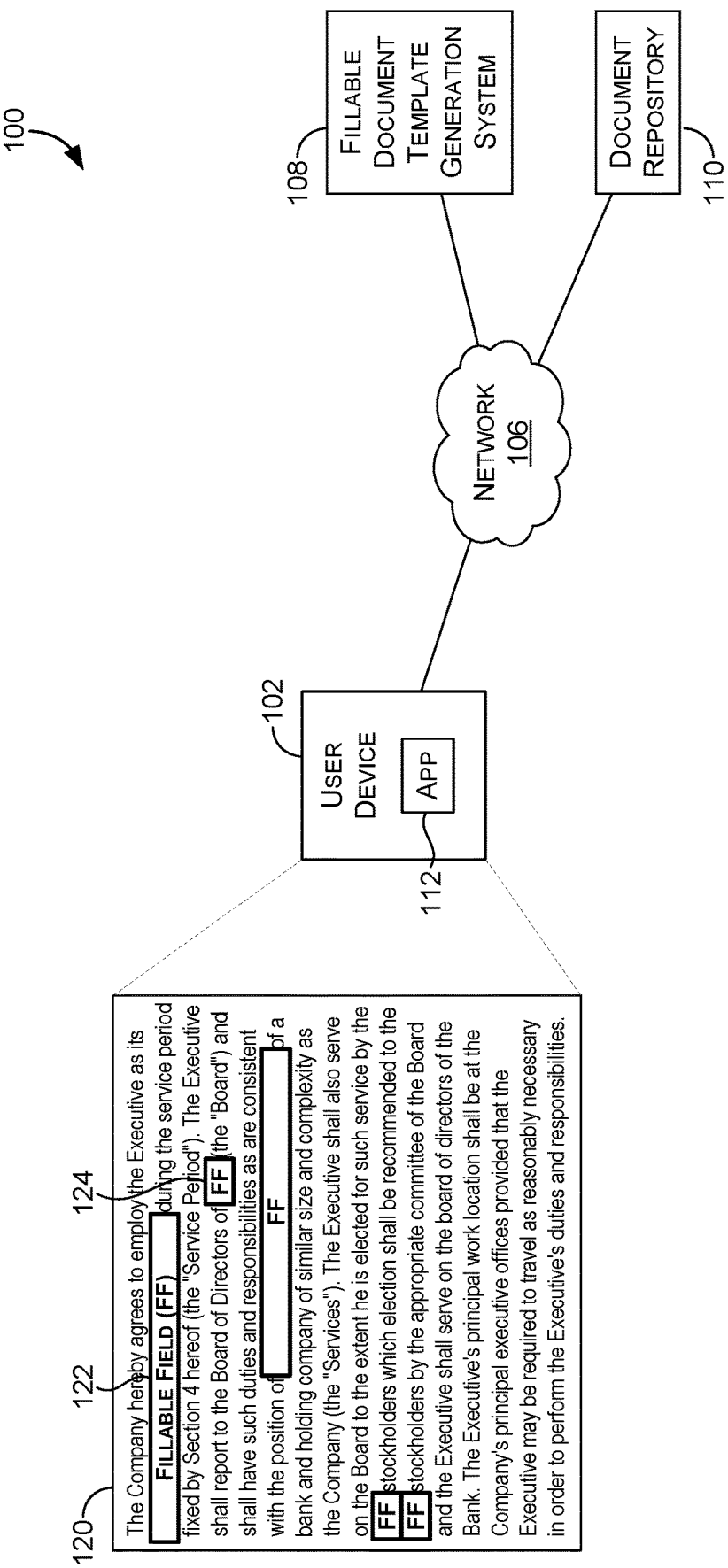
FIG. 1 depicts a diagram of an environment in which one or more embodiments of the present disclosure can be practiced.

As language used in legal documents is critically important, such documents can be tedious and time consuming to create. As such, individuals oftentimes use existing legal documents, such as contracts, as a starting point. In some cases, an individual may search a legal document repository to find a template to use for creating a contract. Searching a repository for a relevant legal document to use as a template, however, can be tedious (e.g., due to limitations on search terms and review of lengthy documents). In other cases, an individual may have access to a legal document for which the individual would like to duplicate or use as a template. However, such a document may not be in an editable form, thereby requiring various resources to duplicate the legal document. Even in cases in which the document is editable, the individual would need to review the legal document and remove information specific to the previous contract. For example, a user may review a legal contract in detail to remove the parties of the contract, term dates, etc. and, thereafter, replace the content with terms appropriate for the current usage of the legal contract. Accordingly, such a manual effort to create a legal document (e.g., contract) based on an existing legal document can be tedious, time-consuming, and error prone. Further, such a manual process also requires and consumes computing resources to navigate the document, to process the removal of language or terms and the creation of fillable regions, and to make appropriate modifications.

Accordingly, embodiments described herein are directed to facilitating automatic generation of fillable document templates. In this regard, a template for a document, such as a legal document (e.g., a contract), can be automatically generated with fillable fields or regions such that a user can input text into the fillable regions to complete or create a desired document. In particular, dynamic tokens (e.g., words) that are particular to a specific instance of a document are automatically identified and removed from the existing document such that a user may provide user input into a fillable portion that replaces the identified dynamic tokens.

At a high level, in accordance with obtaining a document, such as a contract, dynamic tokens within the document can be identified. A dynamic token generally refers to any token (e.g., word) within the document that is to be removed from, or modified within, the document. In the context of a contract, dynamic tokens may generally be terms that are specific to a particular contract. For example, a name of an individual, entity, or party; a date; a monetary amount; and/or the like may be text identified as dynamic tokens that a user would desire to customize to a particular current need. Upon identifying dynamic tokens, the dynamic tokens can be replaced with a fillable field to generate a fillable document template. As such, a user may access the fillable document template and provide input, such as text, in the fillable field to create a desired document. Advantageously, a user is not required to review the document in detail to identify and remove aspects desired to be changed to create a suitable document. Rather, such text is automatically identified and removed to generate a fillable document template ready for a user to input desired text. In some cases, a data type associated with the fillable field may be identified and provided in association with the fillable document template to provide insight or suggestions to a user as to a type of text to provide in the fillable fields.

In operation, to identify dynamic tokens, a token identifying model can be used. A token identifying model may be a machine learning model that is trained using training documents, or portions thereof, and corresponding token state indicators. Token state indicators generally indicate whether a token is a dynamic token or a static token. As described, dynamic tokens are desired to be removed the document, while static token are desired to be maintained in the document. Dynamic tokens typically include text that a user would input to complete a document to be suitable for a particular situation. As such, among a set of contracts, the dynamic tokens would generally be different inputs in difference agreements. Token state indicators can provide such an indication in any number of formats, such as 0s and 1s (e.g., 0s represent static tokens and 1s represent dynamic tokens).

In embodiments described herein, token states can be identified for various tokens in a document. To do so, and at a high level, similar documents can be grouped together and differences between the similar documents can be identified. Such differences between similar documents can then be identified or designated as dynamic tokens, while the remaining tokens can be identified or designated as static tokens. In some embodiments, to cluster similar documents, a bag-of-words similarity analysis and a word-order similarity analysis may be used. Using a bag-of-words similarity analysis reduces the number of potentially similar documents and, as such, decreases the number of document pairs for which to perform a word-order similarity analysis, thereby reducing computing resource utilization. As described, in embodiments, to identify token states, text differences are identified among similar documents. Such differences can be determined on a pair-wise basis within each cluster of similar documents and/or at a group-level basis.

Advantageously, using a machine learning model to facilitate generation of a fillable document template enables an efficient and accurate identification of dynamic tokens to remove from a document and replace with a fillable field. In addition to use of a machine learning model to identify dynamic tokens, the machine learning model can be efficiently and effectively trained using training data generated in accordance with embodiments described herein. In particular, in accordance with embodiments described herein, training data, such as token state indicators, are efficiently generated using a multi-tiered approach to identify similar documents, thereby reducing computing resources needed to perform such functionality. Further, analyzing various documents to generate the training dataset enables a more robust dataset to use for training, thereby resulting in a more effective and accurate machine learning model prediction of dynamic tokens.

Turning to FIG. 1, FIG. 1 is a diagram of an environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1 is an example of one suitable operating environment. Among other components not shown, operating environment 100 includes a user device 102, a network 106, a Tillable document template generation system 108, and a data repository 110. Each of the components shown in FIG. 1 may be implemented via any type of computing device, such as one or more of computing device 700 described in connection to FIG. 7, for example. These components may communicate with each other via network 106, which may be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

It should be understood that any number of devices, servers, and other components may be employed within operating environment 100 within the scope of the present disclosure. Each may comprise a single device or multiple devices cooperating in a distributed environment.

User device 102 can be any type of computing device capable of being operated by a user associated with initiating generation of a fillable document template. In some cases, a user may be an individual desiring to use the fillable document template to create a document, such as a legal document (e.g., a contract). In other cases, a user may be an individual initiating generation of a fillable document template(s), for example, for storing in a repository for subsequent use (e.g., by employees in an organization). In some implementations, user device 102 is the type of computing device described in relation to FIG. 7. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 112 shown in FIG. 1. Application 112 is referred to as a single application for simplicity, but its functionality can be embodied by one or more applications in practice.

The application(s) may generally be any application capable of facilitating the exchange of information between the user device 102 and the fillable document template generation system 108 in carrying out fillable document generation. In some implementations, the application(s) comprises a web application, which can run in a web browser, and could be hosted at least partially on the server-side of environment 100. In addition, or instead, the application(s) can comprise a dedicated application, such as an application being supported by the user device 102 and the fillable document template generation system 108. In some cases, the application is integrated into the operating system (e.g., as a service). It is therefore contemplated herein that "application" be interpreted broadly.

In accordance with embodiments herein, the application 112 can facilitate generation of fillable document templates. For example, a user of the user device 102 may use application 112 to provide a document, or an indication of a document, for which a fillable document template is desired to be created. In some cases, the user may provide or specify a set of documents for which fillable document templates are desired to be created. A document may be any type of document and in any of a number of formats. In embodiments described herein, the document is generally referred to as a legal document and, in particular, a legal contract. However, use of the term document herein is not intended to be limited to legal documents, and other types of documents are contemplated within the scope of embodiments described herein. Although, in some embodiments, a user device 102 may provide a document, embodiments described herein are not limited hereto. For example, in some cases, an indication of a document may be provided via the user device 102 and, in such cases, the fillable document template generation system 108 may obtain such a document from another data source (e.g., a data store).

In some cases, a user of a user device 102 (e.g., via application 112) may indicate a set of training documents to use for generating a training dataset to train a token identifying model. For instance, a user may specify a repository of legal documents to use for training a token identifying model.

The fillable document template generation system 108 is generally configured to generate fillable document templates. In this regard, the fillable document template generation system 108 generates a fillable document template that can be completed or used by an individual to create a document, such as a legal contract. As described herein, the fillable document template is desired to provide language that is desired to be maintained in the document and fillable fields in which a user can provide input to complete the document. In accordance with embodiments described herein, the fillable document template generation system 108 generates fillable document templates in an automated manner such that regions in which a user likely desires to provide input specific to a particular scenario are automatically identified and replaced with fillable regions for accepting user input. Advantageously, a machine learning model, generally referred to herein as a token identifying model, can efficiently and effectively identify the dynamic tokens for which to replace with fillable fields. To this end, the machine learning model can be trained on a robust training dataset such that the machine learning model can effectively identify dynamic tokens. To avoid the time-intensive and resource-intensive process of human labeling tokens as dynamic or static for training purposes, embodiments described herein provide an implementation for generating a training dataset to use for training. Such a generated training dataset includes a set of token state indicators that indicate a state of various tokens in documents, or portions thereof. The token state indicators can be efficiently and effectively identified, thereby foregoing the computing resources needed for human token labeling.

At a high level, the fillable document template generation system 108 can generate a training dataset to use for training a token identifying model. To generate a training dataset, a set of training documents can be referenced or accessed from a repository, such as a document repository 110. The document repository 110 may include any number and format of documents. In some embodiments, the document repository may include a set of existing legal documents previously completed by individuals or entities. The fillable document template generation system 108 may generate a training dataset by identifying token states of tokens, such as words, in the training documents. In embodiments, to identify token states, the fillable document template generation system 108 groups or clusters similar training documents and, thereafter, identifies differences among the similar training documents. Such differences can be identified or designated as dynamic tokens, while aspects that are consistent or maintained across similar training documents can be identified as static tokens. Using the token state identifiers along with corresponding training documents, or portions thereof, a token identifying model can be trained and, thereafter, used to identify dynamic tokens in given documents. The identified dynamic tokens can be replaced with a fillable field to generate a fillable document template.

For cloud-based implementations, the instructions on fillable document template generation system 108 may implement one or more components of fillable document template generation system 108, and application 112 may be utilized to interface with the functionality implemented on fillable document template generation system 108. In some cases, the components, or portion thereof, of fillable document template generation system 108 may be implemented on a user device, or other system or device. Thus, it should be appreciated that fillable document template generation system 108 may be provided via multiple devices arranged in a distributed environment that collectively provide the functionality described herein. Additionally, other components not shown may also be included within the distributed environment.

In accordance with generating a fillable document template, the fillable document template generation system 108 may provide such a fillable document template for subsequent use. For example, in some embodiments, the fillable document template generation system 108 may provide the template to the requesting user device, such as user device 102. The user device 102 may obtain the template and, via application 112, display or present the template to the user such that the user may complete the template to generate a desired document (e.g., a legal contract). One example of a fillable document template 120 represented as a legal contract is provided in FIG. 1. As shown, a user may provide input to fillable fields 122 and 124. Such data input into fillable fields 122 and 124 may, in some cases, be carried out through the document as appropriate to maintain consistent text in an efficient manner.

Figure 2:
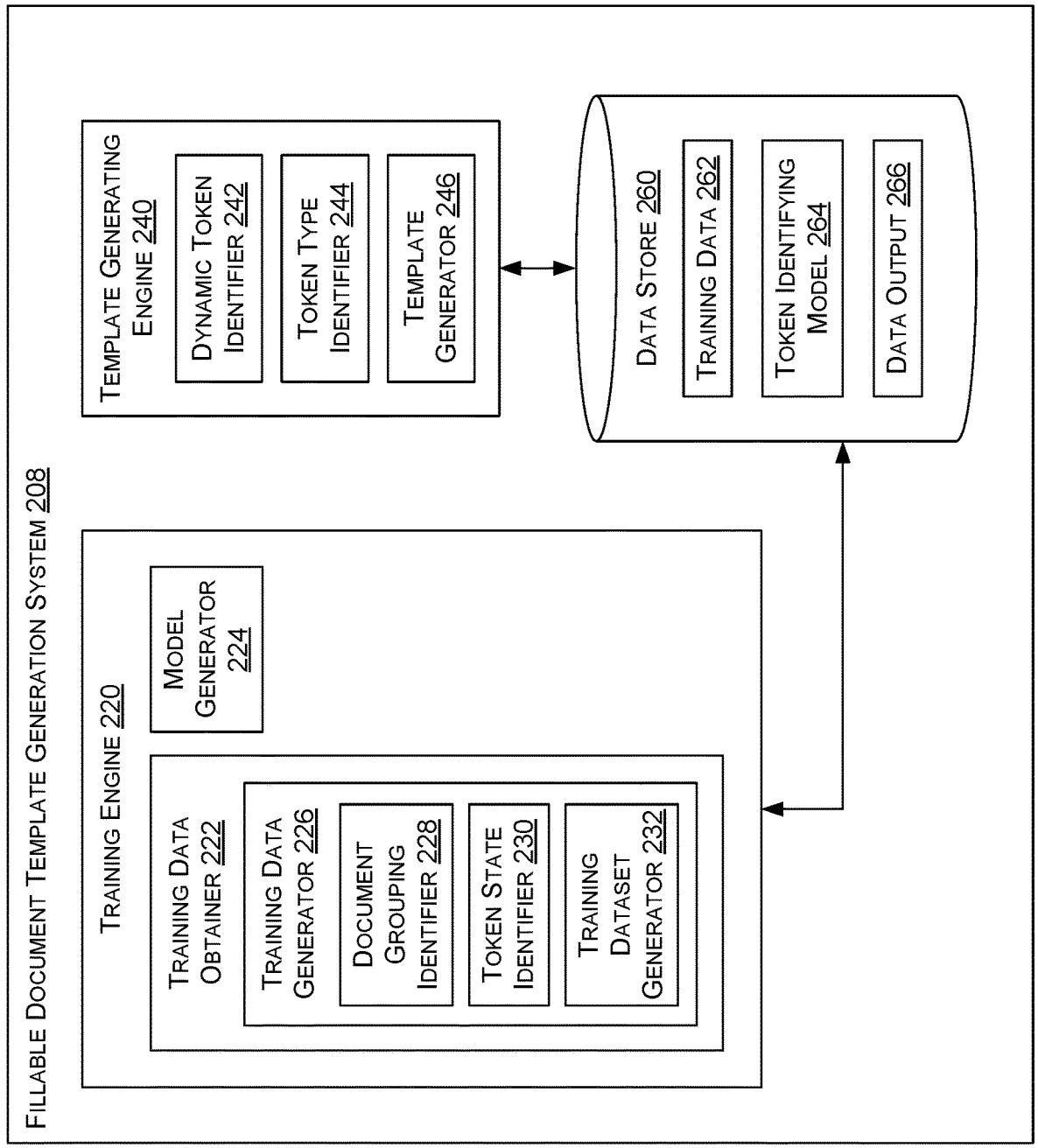
FIG. 2 depicts an illustrative representative fillable document template generation system, in accordance with various embodiments of the present disclosure.

Referring to FIG. 2, aspects of an illustrative fillable document template generation system are shown, in accordance with various embodiments of the present disclosure. Fillable document template generation system 208 includes training engine 220, template generating engine 240, and data store 260. The foregoing components of fillable document template generation system 208 can be implemented, for example, in operating environment 100 of FIG. 1.

Data store 260 can store computer instructions (e.g., software program instructions, routines, or services), data, and/or models used in embodiments described herein. In some implementations, data store 260 stores information or data received via the various components of training engine 220 and/or template generating engine 240 and provides the various components with access to that information or data, as needed. Although depicted as a single component, data store 260 may be embodied as one or more data stores. Further, the information in data store 260 may be distributed in any suitable manner across one or more data stores for storage (which may be hosted externally).

In embodiments, data stored in data store 260 includes training data 262. Training data generally refers to data used to train a token identifying model, or portion thereof. As such, training data 262 can include training documents, or portions thereof, token state indicators, and/or the like. In some cases, fillable document template generation system 208 can receive data from devices (e.g., received from user device via, for example, application 112 of FIG. 1 and/or a document repository, such as document repository 110 of FIG. 1). Additionally or alternatively, fillable document template generation system 208 can receive data from another component or device. Such received data may be stored in the data store 260.

Data store 260 can also be used to store token identifying model 264, or a portion(s) thereof. Data store 260 may also store data output 266, which may include any output, such as model outputs (e.g., token state identifications), template outputs, and/or the like. Any other data computed by or used by training engine 220 and/or template generating engine 240, and/or aspects associated therewith, may be stored in data store 260 or any other data store accessible to the fillable document template generation system 208.

Training engine 220 is generally configured to train a token identifying model. Such a token identifying model can be used to predict or classify a state of a token, that is, whether input tokens are static or dynamic. As described herein, a static token refers to a token that is to be maintained in a fillable document template. That is, a static token should not change in a fillable document template. A dynamic token refers to a token that is to be modified in a fillable document template. In this regard, a token identified as a dynamic token may be modified to a default value or fillable portion in a fillable document template. In embodiments, a token identifying model generally predicts whether tokens are static or dynamic. Accordingly, the training engine 220 utilizes training data including various tokens and corresponding token state indicators to generate or train a token identifying model for use in predicting token states.

As depicted in FIG. 2, training engine 220 includes a training data obtainer 222 and a model generator 224. As can be appreciated, the functionality described in association therewith can be performed by any number of components.

The training data obtainer 222 is generally configured to obtain training data. Training data generally refers to any type of data used to train a token identifying model. As described herein, training data may include, by way of example, a set of tokens and corresponding state indicators. As can be appreciated, any number of training data can be collected and/or used to train a token identifying model. Training data may be stored or captured in a data store, such as data store 260.

A set of tokens generally refers to any number of tokens or words associated with a document. A token is generally referred to herein as a sequence of characters that are grouped together as a useful semantic unit. Generally, as used herein, a token refers to a word or a term. A set of tokens may include tokens in a document, tokens in a paragraph of a document, tokens in a sentence of a document, or any other tokens associated with a segment of a document. A token state indicator, or state indicator, refers to an indication of a state of a token, that is, whether the token is identified as being a static token or a dynamic token. An indication of a state of a token may be represented in any number of ways. For example, a token state may be represented using the terms "static" or "dynamic." As another example, a token state may be represented using 0s and 1s. For example, a static term may be represented using a "0," and a dynamic term may be represented using a "1," or vice versa.

A training dataset may be obtained in any number of ways. As one example, a training dataset may be received or retrieved, for example, from a data store (e.g., data store 260) or another device(s) (e.g., a device accessible over the network). For instance, a set of documents and corresponding token state indicators may be accessed via a repository of documents and used as a training dataset. As one example, such data may be obtained in accordance with training a token identifying model, and/or portions thereof. By way of example only, assume a user desires to generate a fillable document template. In such a case, the user, via a user device, may select to generate a fillable document template and, based on such a selection, the training data obtainer 222 may obtain training data (e.g., via a data store or repository containing training data or documents). In other cases, such training data may be obtained automatically (e.g., in accordance with expiration of a time duration or on a periodic basis, etc.).

As another example, a training dataset may be determined or generated via the training data obtainer 222, for example via training data generator 226. Training data generator 226 provides one example for generating a training dataset for use in training a token identifying model. Advantageously, training data generator 226 can generate training data such that pre-labeled training data (e.g., labeled via a human) is not needed. As described, human pre-labeled training data can be tedious to generate and error-prone. For example, a human reviewing each training document to label each word as static or dynamic is very resource intensive.

Generally, to generate a training dataset, the training data generator 226 obtains a set of documents, also referred to as training documents. Such documents may be obtained from a data store or repository hosting various documents. For example, the training data generator 226 may obtain a set of legal documents, or legal contracts, from a repository. In some cases, such a set of documents may be specified, for example, by a user initiating training of the token identifying model or initiating generation of a fillable document template.

In one example, training data generator 226 includes a document grouping identifier 228 and a token state identifier 230. As can be appreciated, the functionality described in association therewith can be performed by any number of components.

The document grouping identifier 228 is generally configured to identify groups of similar documents. As described herein, to determine dynamic tokens in training documents, similar documents are grouped together so that distinctions or differences between the similar documents can be made. In cases in which distinctions or differences are determined between documents that are different, many of the tokens would be identified as dynamic and thereby result in an inaccurate or unhelpful identification of dynamic tokens. Accordingly, in some embodiments described herein, distinctions or differences are determined between documents that are similar.

Any number of techniques may be used to identify and group similar documents. In embodiments, the document grouping identifier 228 can identify similar documents according to content similarity between documents. As such, the document grouping identifier 228 can group together documents with similar content.

In some cases, the document grouping identifier 228 can compare pairs of documents within the set of training documents to one another to identify similarity between documents. Identifying similarity of documents can be performed in any of a number of ways.

As one example, a bag-of-words approach may be used to identify similar documents. In this regard, a bag or collection of words corresponding with documents, or a portion thereof, can be obtained and compared to one another. In this regard, similarity between two different collections of words (e.g., from two different documents) can be determined, irrespective of the order of the words. Such a similarity comparison may be performed using MinHash-LSH (local sensitive hashing scheme) to represent the documents, or portions thereof, as a bag-of-words and, thereafter, performing Jaccard similarity (intersection over union for sets). Generally, documents that are not similar in terms of bag-of-words cannot be similar while respecting order. Accordingly, such an approach provides a high recall system to identify potentially similar document pairs.

In some cases, the bag-of-word similarity analysis approach may be performed at a logical unit level. A logical unit may be any segment of a document. For example, a logical unit may represent a paragraph. As such, a document may be decomposed or separated into logical units, such as clauses, paragraphs, preambles, signing blocks, etc. A bag-of-words can be generated for each logical unit and comparisons between documents can be performed at the logical unit level. Performing such comparisons at the logical unit level enables comparisons that do not take into account the order of logical units, or paragraphs. Accordingly, in cases in which logical units are located in different positions in the document, two documents may still be identified as similar. In cases in which a logical unit comparison is made, a document-level comparison can be made based on a number or proportion of logical units (e.g., non-trivial logical units or logical units of a certain length) that are similar between a pair of documents. By way of example, assume 17 paragraphs out of 33 paragraphs associated with a pair of documents are identified as similar to one another. In such a case, the documents may be identified as similar. A threshold(s) may be used to determine similarity. For example, a threshold proportion of similar logical units (e.g., 50%) may be used to determine whether two documents are similar.

Advantageously, using a bag-of-words approach to initially group similar documents enables a more efficient process as less word order comparisons for documents need to be performed. In this regard, when documents are not identified as initially similar, a word order comparison does not need to be performed. Accordingly, a number of document comparisons is avoided as a more expensive document comparison is not needed in cases that documents are identified as not obviously similar to one another based on the bag-of-words comparison.

To generate initial groupings, in some cases, pairs of documents identified as similar based on the bag-of-words approach can be associated (e.g., connected with a line). For the documents that associated (e.g., are connected as singular or multiple line parts), such documents form a group or cluster.

Upon identifying initial groupings using a bag-of-words similarity analysis approach, a more fine-grain approach can then be employed to further analyze similarity of documents. A fine-grain approach for analyzing document similarity may include analysis of the order of tokens (e.g., words). By initially performing the bag-of-word approach to initially group documents, less documents need compared via the fine-grain approach. For instance, assume 1000 documents are in an initial training document set. Further assume that upon applying bag-of-words comparisons, 15 groups of documents are generated, with each group having less than 100 documents within the group. Accordingly, the number of a token-level comparisons of documents performed is substantially less than if such token-level comparisons were performed for each pair of documents of the 1000 documents.

In embodiments, a fine-grain approach includes a token-level comparison used to identify similar documents. In this regard, a word-order similarity analysis can be performed following the bag-of-words similarity analysis. In particular, a difference-based analysis can be performed to factor in word order in a pairwise basis. One example technology that may be used to perform a difference-based analysis is diff-match-patch. Diff-match-patch can be used to identify differences between a pair of documents (e.g., among document pairs identified as similar via a bag-of-words analysis). Diff-match-patch refers to a set of algorithms that performs operations to synchronize text. The diff algorithm compares two blocks of text and returns a list of differences. The match algorithm finds a best fuzzy match in a block of text given a search string. The patch algorithm applies a list of patches onto the text.

Generally, diff-match-patch identifies how much needs to change for one set of text (e.g., paragraph) to become another set of text (e.g., paragraph). The number of edits (e.g., at word level) can be taken as the level of dissimilarity between the documents (normalized by the document lengths). In some cases, the level of dissimilarity can be converted to a similarity, for instance, by normalizing the number of required edits by the length of the document and then subtracting from 1. As such, performing diff-match-patch in association with documents initially identified as similar (e.g., via bag-of-words similarity analysis) further refines the documents identified as similar. To this end, diff-match-patch refines documents identified as similar, generally only differing in relatively few words rather than a completely different order of the words.

In accordance with performing diff-match-patch, an extent of similarity between documents is determined. The extent of similarity may represent a similarity or dissimilarity between documents. For documents that were not in a list of candidate similar documents (e.g., identified via performing bag-of-words analysis), the extent of similarity may be a default value, such as 0 (e.g., indicating no similarity). Advantageously, performing diff-match-patch on document pairs initially identified as similar (e.g., via bag-of-words analysis), as opposed to performing on all documents pairs, reduces utilization of computing resources. For example, each document can be treated as a node and the similarity between them as an edge. If a pair of documents is not in a potentially similar list, identifying similarity via diff-match-patch can be avoided and a default value can be assigned for the document pair.

The document grouping identifier 228 can then use a clustering algorithm to identify clusters or groups of similar documents. In this regard, the level of similarity identified via diff-match-patch can be used to cluster documents. Any clustering algorithm may be used. For example, a density-based spatial clustering of applications with noise (DB-SCAN) may be employed to cluster documents. If the similarity threshold is reasonably high in DBSCAN, near duplicate documents, generally only differing in dynamic content, are clustered together while having similar template boiler-plate content.

The token state identifier 230 is generally configured to identify states of tokens within documents. In embodiments, token states may include a static token state and a dynamic token state. At a high level, to do so, the token state identifier 230 identifies differences between similar documents. As such, for documents grouped or clustered together as similar, the token state identifier 230 can identify text that is different between the documents.

To identify token states, the token state identifier 230 can identify changes or differences between document pairs. Initially, the token state identifier 230 may execute diff-match-patch, or a portion thereof, or utilize the results previously generated via diff-match-patch performed for document grouping.

In some cases, such differences can be used to identify word differences between documents, or portions thereof (e.g., paragraphs). An identified difference (e.g., via application of diff-match-patch) may provide character-level changes. As such, the token state identifier 230 may extend the difference boundary to word boundaries to ensure a word is not separated. In this regard, upon identifying character-level differences (e.g., via a diff-match-patch), any differences are extended in association with a word boundary such that different words are detected (as opposed to fraction of words).

In some cases, the token state identifier 230 may designate such word differences as dynamic tokens. In other cases, the token state identifier 230 may analyze the identified word differences and perform entity extensions. In this way, the token state identifier 230 may extend the boundaries of the dynamic tokens to include entities associated with a word(s). An entity may include a set of words used together to refer to an entity. For example, an entity may refer to, indicate, or specify, for example, an individual, a company, a location, an address, a phone number, a date, etc. Extending boundaries to include entities enables a more accurate identification of dynamic tokens. For example, assume two documents are created in the same year. Even though a day and month may be different, a difference identified may not include the year as the two documents were created in the same year. Only identifying a day and a month as dynamic, however, may result in an inaccurate template. Similarly, parts of names may overlap across documents, but identifying the entire name as dynamic will result in a more accurate template as the entirety of the name should be removed to create the template.

In some embodiments, to perform entity extensions, named entity recognition (NER) and/or noun phrase detection can be performed on the documents. NER generally recognizes entities, and noun phrase detection generally recognizes noun phrases (e.g., research scientist). Such entity recognition can be combined with the identified differences (e.g., via diff-match-patch output). In this regard, if any part of a named entity/noun phrase is identified as a difference, the boundary of the difference is extended to the boundary of the named entity/noun phrase. In some implementations, a document or a paragraph, or other logical unit (e.g., a sentence), can be provided to the NER and/or noun phrase detection to identify entities. In accordance with identifying an entity(s), the boundaries associated with words identified as dynamic are extended to include the entire entity.

Additionally or alternatively, to identify dynamic tokens, the token state identifier 230 can identify changes between an aggregation or group of documents. For example, a cluster or group of similar documents (as identified via document grouping identifier 228) can be analyzed. Utilizing a group-based analysis enables a more generalized detection of dynamic tokens. By way of example, assume two documents are compared and a company name is not recognized as both documents are associated with the same company. Further assume that other documents in the group are associated with another company. As such, in analyzing the group of documents, the company name can be recognized as a dynamic token. Similarly, assume two individuals are hired on a same day and, as such, have a same date in an employment contract, thereby resulting in the date not being initially identified as dynamic in a comparison of the two documents. However, in analyzing a group of documents associated with different hiring dates, the date can be detected as a dynamic token.

A group of documents can be analyzed in any number of ways to identify dynamic tokens. As one example, to perform identification of dynamic tokens via a document group analysis, pairs of documents can be merged into one by grouping all tokens identified as different into one list. For instance, if a name differs in two documents, but the rest of the content is same, a merged document can be created with the two names in a list (e.g., enclosed by <<< >>>). A difference analysis (e.g., diff-match-patch) can be performed between the merged documents and further differences between such merged documents can be collected into lists. Such a process can be continued until a single merged document includes a list of all changes in the respective places of the merged document. The content changing across documents can be collected in lists and identified as dynamic tokens. Using such approaches, the token state identifier 230 can identify token states for various tokens.

A training dataset generator 232 is generally configured to generate a training dataset. In this regard, the training dataset generator 232 can generate a training dataset based on the identified token states. For a training document, or portion thereof (e.g., paragraph), the set of tokens along with token state indicators can be used as the training dataset. The token state indicators generally indicate which tokens in the text are dynamic and/or which tokens in the text are static. Such token state indicators can be in any number of formats. As one example, 1s and 0s may be used to denote whether a token is a dynamic token or a static token. As another example, an indication of where dynamic tokens start, stop, and otherwise exist may be used to indicate token state.

In some embodiments, the training dataset generator 232 may divide or separate a document into paragraphs, or other logical units, for inputting to train a token identifying model. For instance, the training dataset generator 232 may separate a training document into the various paragraphs, with each paragraph being used as an input to train the token identifying model.

In accordance with obtaining training datasets, the model generator 224 can use such data to train a token identifying model. In this regard, the model generator 224 is generally configured to generate or train a token identifying model. As described, a token identifying model generally refers to any model, such as a machine learning model, that can predict or identify token states for tokens in a document. To train a token identifying model, the model generator 224 may use a training dataset that includes a document (e.g., original document), or a portion thereof, and corresponding state indicators indicating whether the tokens are dynamic and/or whether the tokens are static. For example, in some cases, a training dataset may include a state indicator for each token (e.g., via 0s and 1s). In other cases, a training dataset may include state indicators for only the tokens identified as dynamic, or conversely, for only the tokens identified as static.

In some cases, the training datasets, or portions thereof, may be represented in the form of vectors. In this regard, the training datasets used to train the token identifying model can include vector embeddings representing text (e.g., a paragraph, sentence, document). A vector embedding may be generated in any number of ways. A vector embedding may be generated for each token of a selected text (e.g., paragraph). In some cases, a language model may be used to generate a vector embedding. One example of such a language mode is a bidirectional encoder representations from transformers (BERT). BERT is a transformer-based machine learning technique for natural language processing pre-training. BERT is a language model that helps understand given text, the presentation in a space, such that if two texts have similar meaning they will lie close to each other in that space. BERT may represent information via a 1,024 dimension vector, for example.

The training datasets can be fed or input to train a token identifying model. As described, the training datasets may include representations of the text (e.g., a paragraph) and state indicators associated therewith. For example, a representation of a paragraph of a document and corresponding state indicators may be input to train the token identifying model. In some embodiments, the token identifying model is trained across various groups of documents. In this regard, representations of documents and corresponding state indicators associated with multiple groups of documents can be used to train the token identifying model.

A token identifying model may be any type of model, such as a machine learning model. A machine learning model may be in any number of forms. As one example, a machine learning model is in the form of a classification model, such as a classification model based on neural networks, decision trees, decision forests, and/or other algorithms.

During training, the token identifying model learns how to take a text representation (e.g., a representation of a paragraph of text) as an input and produce a state prediction for various tokens. For example, the token identifying model may produce or output a prediction of whether each input token is static or dynamic (e.g., via usage of 0s and 1s). As another example, the token identifying model may produce or output a prediction of a start of a dynamic portion and until an end of the dynamic portion.

To train a token identifying model, a loss function(s) may be used. Stated differently, the token identifying model, or portions thereof, can be trained by evaluating loss to determine any errors or discrepancies. Errors can include inaccuracies, flaws, variations, and/or divergences between the training output and the desired output, often referred to as the ground-truth or output if the model or network was perfectly trained. This desired output may be reflected as the original training dataset, or a portion thereof (e.g., state indicators), and used for comparison with the training output (e.g., state predictions). In some embodiments, updating or training the model involves feeding errors back through the model so the algorithm can adjust parameters in order to reduce the value of the error. For example, backpropagation can be applied to train the token identifying model to optimize and reduce error in the predictions.

Any type of loss function may be used in association with the token identifying model to train the model. For example, in cases in which the token identifying model is in the form of a binary classification model, a binary cross-entropy loss function or a hinge loss function may be used. The trained token identifying model can be stored, for example, at data store 260.

Turning to the template generating engine, the template generating engine 240 is generally configured to generate fillable document templates. As previously described, a fillable document template generally refers to a template of a document that includes a fillable portion(s). A fillable portion refers to a portion that is unfilled and can be filled by a user. In this regard, a user may provide text input into the fillable portion. In embodiments, the fillable document template is a template for a legal document or legal contract. In this way, the fillable portion is a portion that can be specific to the user. Stated differently, a fillable document template may be a blank, standard form that can be filled in with information and used as a contract. Portions in the template that are not fillable portions are generally referred to as static portions. The static portions may be referred to a standard or general language, or boiler plate language. In some cases, the user may modify such static portions.

Generally, a document for which to generate a fillable document template is obtained by the template generating engine 240. In some cases, a user desiring to complete or fill in a document template may provide a document, or an indication thereof, to the template generating engine 240. In other cases, a document, or indication, for which to generate a fillable document template may be provided or obtained. For example, a set of documents in a contract repository may be obtained to generate templates for each of the documents. Such templates may be stored for subsequent users.

To generate fillable document templates, the template generating engine 240 may include a dynamic token identifier 242, a token type identifier 244, and a template generator 246. As can be appreciated, the functionality described in association therewith can be performed by any number of components.

The dynamic token identifier 242 is generally configured to identify dynamic tokens. The dynamic token identifier 242 can include, or use, the trained token identifying model to predict states of tokens. In some cases, a token state is predicted for each token input to the model. For example, the token identifying model may take a set of tokens as input (e.g., a paragraph, a document, a sentence, etc.) and provide as output a state prediction associated with each token, for instance indicating whether the token is static (e.g., 0) or dynamic (e.g., 1). As another example, the token identifying model may take a set of tokens as input and provide as output an indication of a beginning, middle, and/or end or a dynamic token, or not within the boundaries of a dynamic token. In this regard, rather than making an independent decision for each token, the token identify model can predict a start of a dynamic token and an end of the dynamic token.

Similar to training, in some cases, the input to the token identifying model can include vector embeddings representing text (e.g., a paragraph, sentence, document). A vector embedding may be generated in any number of ways. A vector embedding may be generated for each token of a selected texted (e.g., paragraph). In some cases, a language model may be used to generate a vector embedding. One example of such a language mode is a bidirectional encoder representations from transformers (BERT). BERT is a transformer-based machine learning technique for natural language processing pre-training. BERT is a language model that helps understand given text, the presentation in a space, such that if two texts have similar meaning they will lie close to each other in that space. BERT may represent information via a 1,024 dimension vector.

The input to the token identifying model can be a representation of a document or any portion thereof. For example, in some embodiments, a paragraph or clause of a document (e.g., a legal contract) may be input to the token identifying model to generate state predictions for each token. In this regard, the dynamic token identifier 242 may divide or separate a document into portions, such as paragraphs, and such document portions may be fed into the token identifying model.

The token identifying model can output state predictions of tokens. In some cases, the token identifying model can provide as output a state prediction associated with each token, for instance indicating whether the token is static (e.g., 0) or dynamic (e.g., 1). As another example, the token identifying model may take a set of tokens as input and provide as output a BIO (beginning, inside, outside) format, indicating a beginning, middle, and/or end or a dynamic token, or not within the boundaries of a dynamic token. A B tag can indicate a beginning of a dynamic token, an I tag can indicate inside a dynamic token, and an O tag can indicate outside a dynamic token.

In some cases, the dynamic token identifier 242 may post process the results to ensure that any token belonging to an entity and/or noun phrase is classified as dynamic. To this end, the dynamic token identifier 242 may extend the boundaries of an identified dynamic token to include an entire entity and/or noun phrase. In some embodiments, to perform such extensions, named entity recognition (NER) and/or noun phrase detection can be performed on the documents. As described, NER generally recognizes entities, and noun phrase detection generally recognizes noun phrases (e.g., research scientist). Such entity recognition can be combined with the identified dynamic tokens (e.g., via a token identifying model). In this regard, if any part of a named entity/noun phrase is identified as a dynamic token, the boundary of the dynamic token is extended to the boundary of the named entity/noun phrase. In some implementations, a document or a paragraph, or other logical unit (e.g., a sentence), can be provided to the NER and/or noun phrase detection to identify entities. In accordance with identifying an entity(s), the boundaries associated with words identified as dynamic are extended to include the entire entity.

The token type identifier 244 is generally configured to identify or determine data types associated with the identified dynamic tokens. A data type generally refers to an indication of a type of data of the dynamic token. Identifying a token data type can be used to provide an indication or suggestion to a user to a type of data that should be input into the fillable portion of the document template. Examples of token data types include, but are not limited to, a date, an amount, a name of a person, a name of an entity, etc.

In some cases, entity recognition may be performed to identify a type of data associated with a dynamic token. In some embodiments, to perform such data type identification, NER and/or noun phrase detection can be performed on the documents, or portions thereof. As described, NER generally recognizes entities, and noun phrase detection generally recognizes noun phrases (e.g., research scientist). In some cases, a document or a paragraph, or other logical unit (e.g., a sentence), can be provided to the NER and/or noun phrase detection to identify data types associated with dynamic tokens. In other cases, a set of dynamic tokens may be provided to the NER and/or noun phrase detection to identify data types.

In some implementations, the token type identifier 242 may analyze other existing documents, or portions thereof, to identify a type of data. For example, assume an entity "Washington" is identified. "Washington" may be the name of a place or the name of a person. Accordingly, the token type identifier 244 may analyze an aggregate of documents, or portions thereof, to understand the type of data. To this end, the token type identifier 244 may identify a closest or similar paragraph(s) or document(s) from the existing corpus of documents. By way of example only, assume a paragraph of an employment contract is being analyzed by the token type identifier 244. In such a case, the token type identifier 244 may identify similar paragraphs in an existing corpus of documents. Now assume that ten paragraphs in the corpus are identified as similar. Such values can be analyzed to understand whether Washington refers to a name of an individual or a geographical location.

In embodiments, linguistic rules (for example, based on a dependency tree) may be used to associate a type of information with additional related details. For example, in addition to identifying that a name is associated with a particular fillable field, the token type identifier 244 may also identify that the name is for the 'Lessee' in the rental agreement. Linguistic analysis can provide additional information related to the data type. With linguistic analysis, a dependency graph of sentences and/or paragraphs can be generated to facilitate identification of word relationships (e.g., which words relate to other words in a sentence). For example, linguistic analysis may identify that the names associated with a first fillable field relate to a name of a person being employed and nouns associated with a second fillable field relate to a title or position of the person (e.g., research scientist).

The token type identifier 244 may additionally or alternatively identify examples of previous values of dynamic tokens. Such examples may be used as examples of a type of data to be filled in a fillable portion of a document. In some cases, examples of data that may be used can be obtained from various documents (e.g., documents identified as similar). In other cases, examples of data that may be used can be predetermined and referenced based on an identified data type for a dynamic token. For instance, when a dynamic token is identified as a name data type, previously determined name examples can be referenced. In some implementations, the token type identifier 244 may identify a closest paragraph or document from the existing corpus of documents. By way of example only, assume a paragraph of an employment contract is being analyzed by the token type identifier 244. In such a case, the token type identifier 244 may identify similar paragraphs in an existing corpus of documents. Now assume that ten paragraphs in the corpus are identified as similar. Values associated with the dynamic token in those paragraphs can be recognized and used as example values.

The template generator 246 is generally configured to generate a fillable document template. To this end, a template of a document (e.g., legal contract) is generated that includes fillable portions in which a user may opt to provide input (e.g., text input). In embodiments, to generate a fillable document template, tokens identified as dynamic are removed and replaced with a fillable field. A fillable field enables a user to provide input or otherwise fill the field. For example, a fillable field enables a user to input text. A fillable field may be in any number of forms, but is generally represented using a blank space in place of the previous location of the dynamic token(s). In some cases, the fillable field may be the same size as the dynamic token. In other cases, the fillable field may be of a different size as the dynamic token. For instance, the fillable field may be a larger size as the dynamic token to enable a variation of the amount of text to input into the fillable field.

In addition to providing fillable fields to replace dynamic tokens, the template generator 246 may provide a special marker or indicator to identify the fillable fields. For example, an icon or text may be used to indicate a fillable field. The template generator 246 may also include a navigation option within the form that enables navigation from one fillable field to a next fillable field in the document. For example, upon providing input in one fillable field and selecting a navigation option, the cursor may move to the next fillable field on the document such that the user can efficiently provide text input in the next fillable field.

As described herein, in some cases, the data types associated with a dynamic token may be identified. Data types may include indications of types of data associated with a dynamic token or examples of data associated with a dynamic token. In such cases, the template generator may include data types in association with a fillable document template. In this way, information can be provided in association with a fillable field indicating the type of information that should be input into the fillable field (e.g., a person's name, a company name, an amount, a date, etc.), semantics of the information (e.g., name of Lessee, date of expiry, etc.), and/or examples of a type of information desired as input for the field (e.g., based on an example document that was used to create the fillable form, etc.). Data types may be included with a fillable document template in any number of ways. For example, in some cases, a data type may be provided in the fillable field in a visually distinguished manner. For instance, the text indicating the data type may be in a different font style or different font color. As another example, upon a user selecting or hovering over the fillable field, a prompt may be presented that provides such data type information. By way of example only, upon selecting a fillable field, a prompt may be provided stating "Please enter the name of the person taking the apartment on lease (data type: Name (String), for example, Joe Wallace)."

In accordance with generating a fillable document template, the template generator 246 can provide or output the fillable document template. In some cases, the fillable document template can be provided to a user (e.g., via a user device). For example, in cases in which a user selects or provides a document from which to generate a fillable document template, the generated fillable document template may be communicated to the user device for display to the user. In this regard, the user may complete, or otherwise use, the fillable document template. In other cases, the fillable document template may be provided to a server or data store for subsequent use by a user or set of users. For instance, the fillable document template may be retained in a company repository of legal contracts for subsequent use by an employee of the company.

Figure 3:
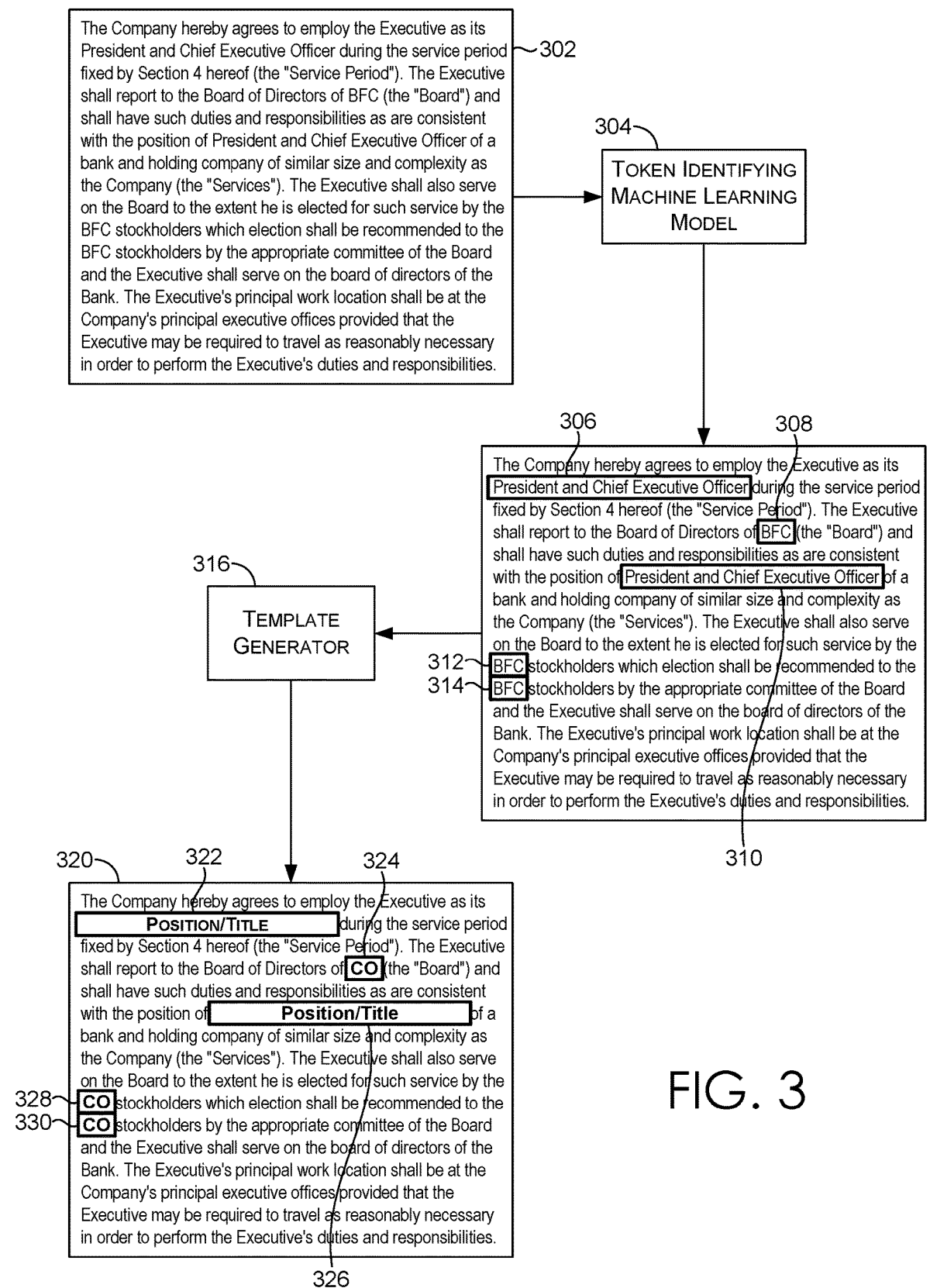
FIG. 3 depicts an example process flow for generating a fillable document template, in accordance with various embodiments of the present disclosure.

By way of example only, FIG. 3 provides one example of generating a fillable document template, or portion thereof. In FIG. 3, assume paragraph 302 is input to a token identifying machine learning model 304. As described, the token identifying machine learning model 304 may take paragraph 302 as input and predict token states for each token, or word, in paragraph 302. The predicted token state may be represented in any number of ways, such as, for example, using 0s and 1s. In this example, assume the token identifying machine learning model 304 identifies dynamic tokens represented by regions 306, 308, 310, 312, and 314. In some cases, portions of the dynamic tokens may be identified as such based on entity extension. For instance, the token identifying machine learning model may have predicted the term "and" between President and Chief to be a static token. However, based on performing entity extension, the term "and" is identified as a dynamic token. Upon identifying dynamic tokens, the template generator 304 can generate a fillable document template 320. To do so, the template generator 304 may replace dynamic tokens with fillable fields such that a user may provide input in non-boiler plate text areas. For instance, fillable fields 322, 324, 326, 328, and 330 may replace the dynamic token regions of 306, 308, 310, 312, and 314, respectively. As shown, in some implementations, a data type may be indicated in the fillable field. For instance, in fillable fields 322 and 326, an indication of a position or title is presented, and in fillable fields 324, 328, and 330, an indication of a company name is presented (represented as "CO"). In some cases, upon a user inputting text into one of the fillable fields, the other fillable fields with the same data type may be automatically completed. For instance, assume a user inputs a position/title of "President" at fillable field 322. In such a case, the fillable field of 326 may be automatically populated with "President."

Figure 4:
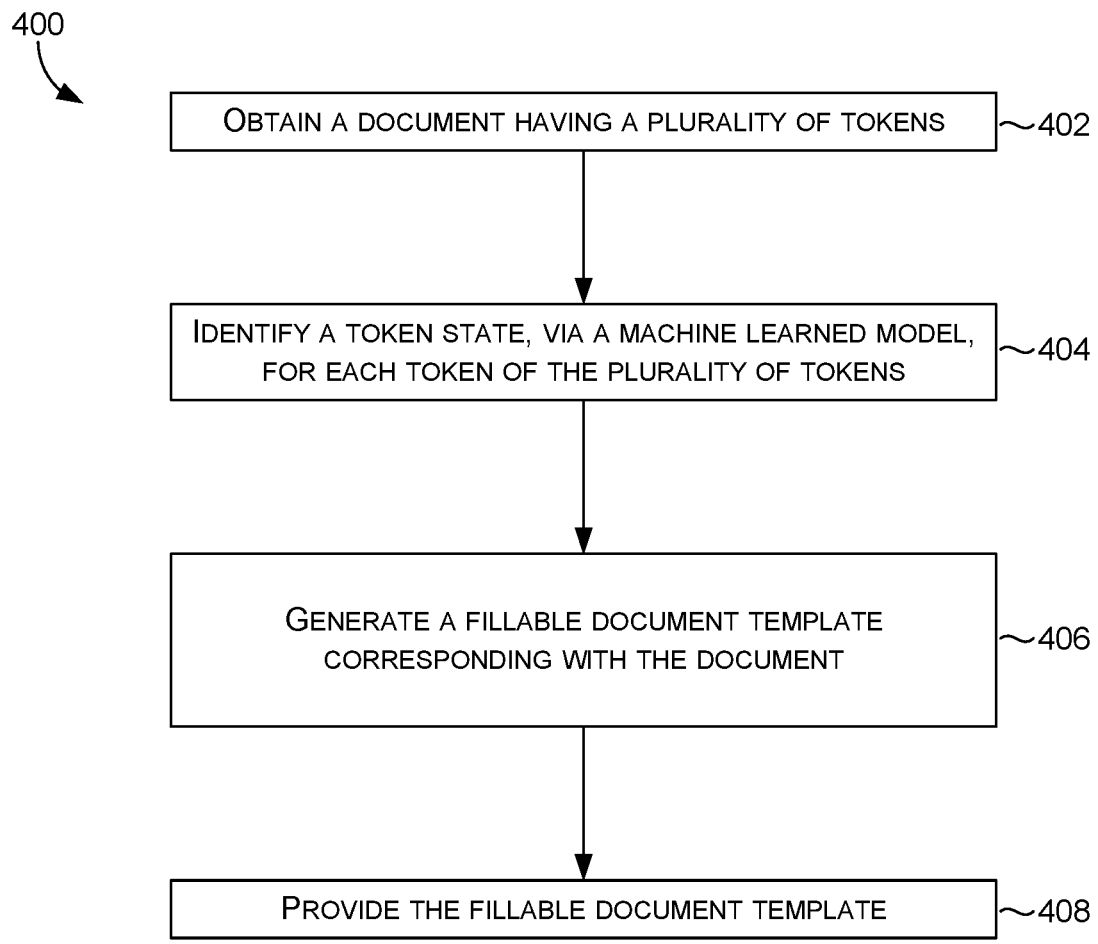
FIG. 4 illustrates an example method for facilitating fillable document template generation, in accordance with embodiments of the present technology.
Figure 5:
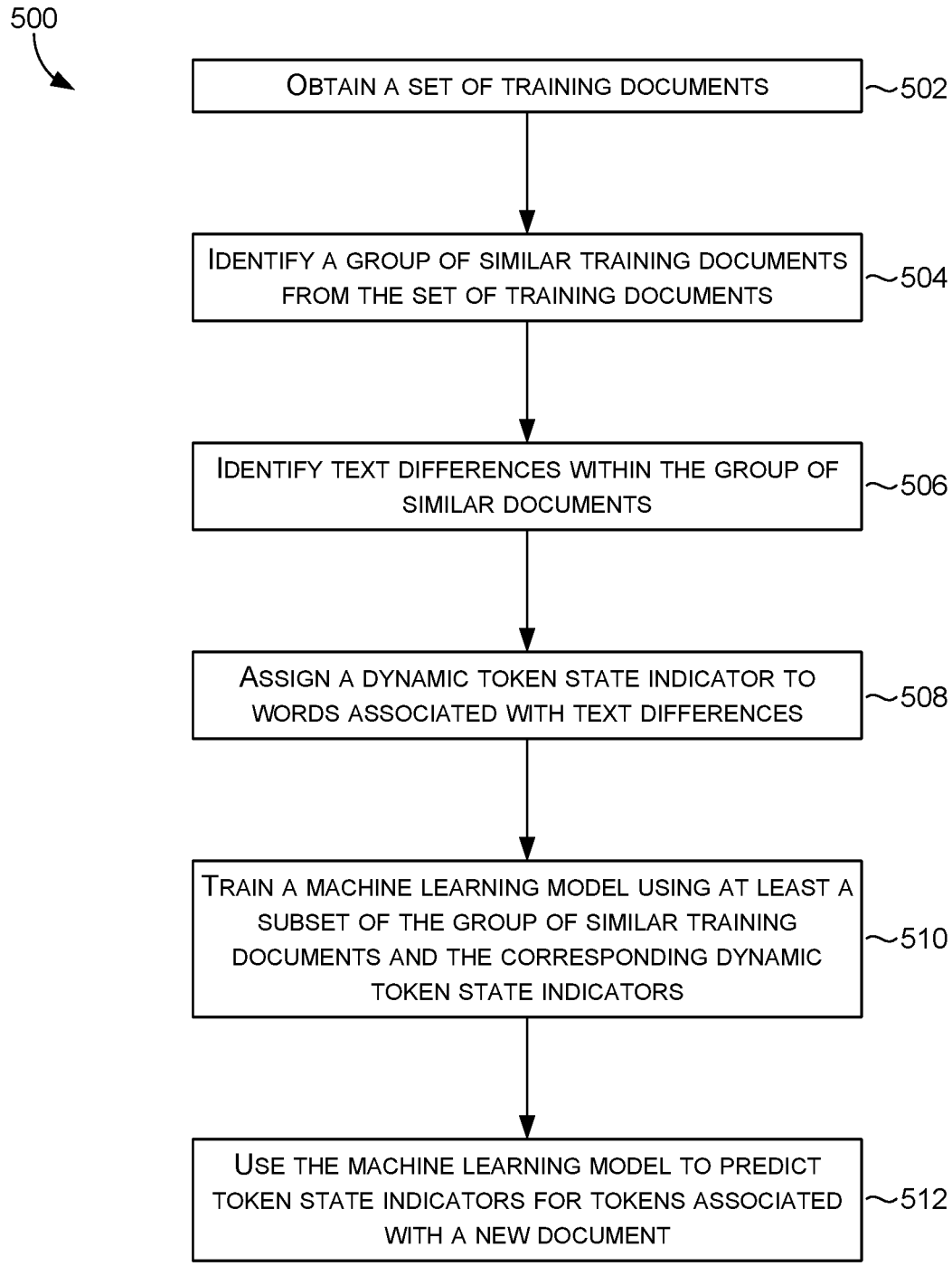
FIG. 5 illustrates an example method for facilitating training of a machine learning model to identify token states, in accordance with embodiments of the present technology.
Figure 6:
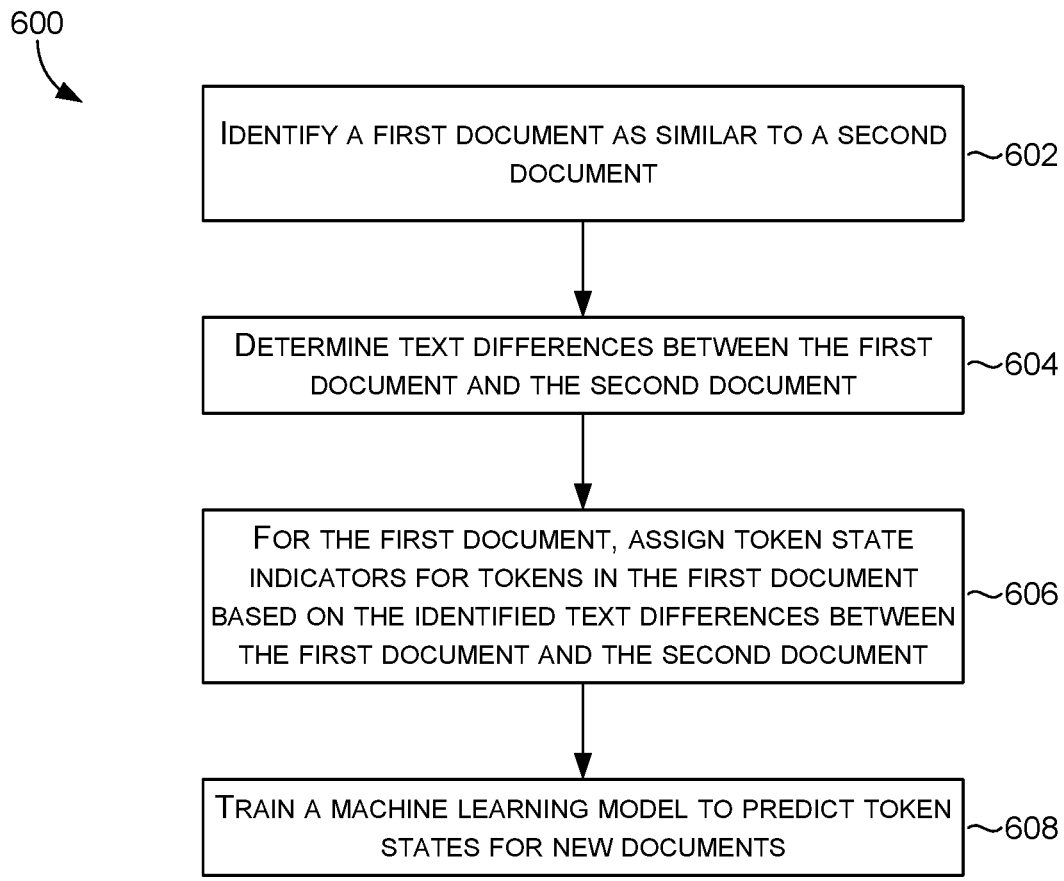
FIG. 6 illustrates an example method for facilitating training of a machine learning model to identify token states, in accordance with embodiments of the present technology.

Turning now to FIGS. 4-6, FIGS. 4-6 provide illustrative flows of methods for facilitation of fillable document template generation. With reference initially to FIG. 4, a process flow is provided showing an embodiment of method 400 for generating a fillable document template, in accordance with embodiments of the present technology. Initially, at block 402, a document having a plurality of tokens is obtained. In embodiments, a document may be a legal document, such as a contract, desired to be converted to a fillable document template. At block 404, a token state is identified, via a machine learned model, for each token of the plurality of tokens. A token state can be a static token state indicating a corresponding token is to be included in a fillable document template or a dynamic token state indicating a corresponding token is to be excluded from the fillable document template. In embodiments, a machine learned model can be trained using a training dataset including a set of training documents and corresponding token state indicators. The token state indicators can be determined by grouping similar training documents and identifying text differences between the similar training documents.

In accordance with identifying token states, at block 406, a fillable document template corresponding with the document is generated. In this regard, the fillable document template can include a fillable field corresponding to the respective dynamic token, for example, by maintaining each static token and replacing each dynamic token with a fillable field to accept subsequent text input. In embodiments, the fillable field is an unfilled region configured to accept text input. At block 408, the fillable document template is provided, for example, to a user device for completion by a user. In some cases, a data type associated with a fillable region may be determined and presented in association with the fillable document template. In this way, a user filling in a fillable document template can be provided with a recommendation or suggestion of data to input in the fillable field.

Turning to FIG. 5, FIG. 5 provides an example method for training a machine learning model for use in generating fillable document templates. At block 502, a set of training documents is obtained. Training documents may be pre-existing documents, such as legal documents or contracts, previously completed by an individual or business. At block 504, a group of similar training documents are identified from the set of training documents. In some implementations, a group of similar training documents can be identified using a bag-of-words similarity analysis (e.g., MinHash-LSH) and/or a word-order similarity analysis (e.g., diff-based similarity analysis on a pairwise basis). Any number of groups of similar training documents may be identified from a set of training documents. At block 506, text differences within the group of similar documents are identified. In embodiments, a diff-match-patch set of algorithms may be used to analyze pairs of training documents to identify text differences.

Based on the identified text differences, at block 508, a dynamic token state indicator is assigned to words associated with the text differences. In embodiments, a static token state indicator can be assigned to words not associated with text differences. In some implementations, entity recognition and/or noun phrase detection may be performed. In such cases, for an identified entity or noun phrase that corresponds with a word assigned a dynamic token state indicator, a dynamic token state indicator is assigned to other words associated with the identified entity or noun phrase. At block 510, a machine learning model is trained using at least a subset of the group of similar training documents and the corresponding dynamic token state indicators to generate a trained machine learning model that predicts token states for new documents. In embodiments, the machine learning model is trained using static token state indicators and dynamic token state indicators. At block 512, the machine learning model is used to predict token state indicators for tokens associated with a new document.

With respect to FIG. 6, another example method is provided for training a machine learning model for use in generating fillable document templates. Initially, at block 602, a first document is identified as similar to a second document. In some embodiments, such a similarity analysis is performed using a bag-of-words similarity analysis and a word-order similarity analysis. Using a bag-of-words similarity analysis can facilitate a more efficient detection or identification of similar documents. At block 604, text differences between the first document and the second document are determined. At block 606, for the first document, token state indicators are assigned for tokens in the first document based on the identified text differences between the first document and the second document. The token state indicators can indicate whether a corresponding token is a static token or a dynamic token. In embodiments, a token state indicator indicates a token is a dynamic token when a text difference between the first document and the second document is identified in association with the token. At block 608, a machine learning model is trained to predict token states for new documents. In implementations, the machine learning model is trained using the tokens in the first document and the corresponding token state indicators.

Figure 7:
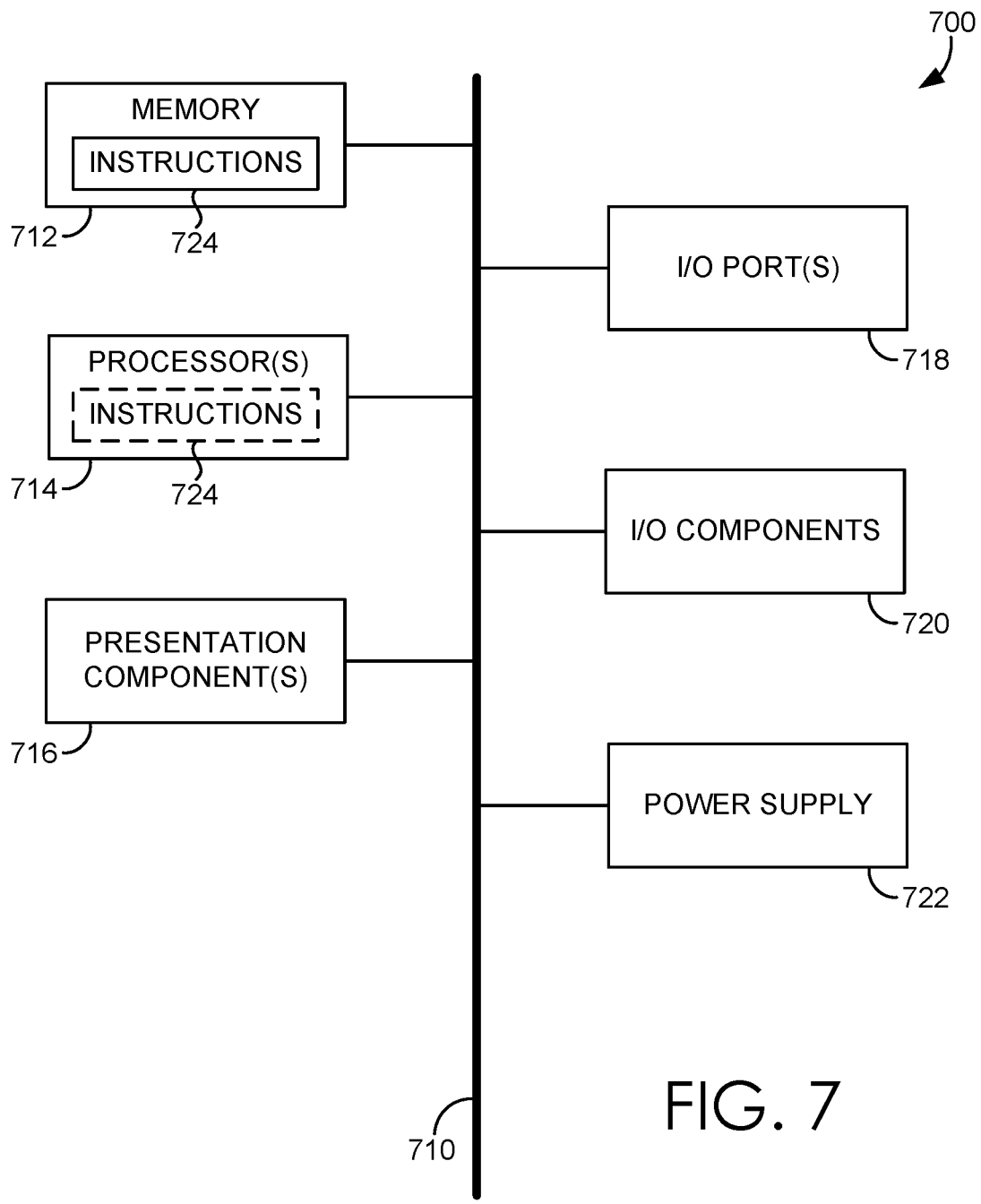
FIG. 7 is a block diagram of an example computing device in which embodiments of the present disclosure may be employed.

Having described embodiments of the present invention, FIG. 7 provides an example of a computing device in which embodiments of the present invention may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present technology. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for converting documents to fillable document templates, the method comprising:
   obtaining, by a processing device, a document having a plurality of tokens in corresponding regions in the document, wherein the regions include text;
   identifying, via a machine learned model, a token state for each token of the plurality of tokens, wherein each token state indicates whether a corresponding token is a static token to be maintained or a dynamic token to be removed, wherein the machine learned model is trained using dynamic token state indicators assigned to words in a set of similar training documents based on text differences within the set of similar training documents; and
   generating a fillable document template corresponding with the document, wherein the fillable document template is generated by, for each dynamic token of the document, removing the dynamic token and replacing the dynamic token with a fillable field that is unfilled enabling text input to be provided into the fillable field.

2. The method of claim 1, wherein the generated fillable document template includes the static tokens, or representations thereof.

3. The method of claim 1 further comprising:
   identifying an entity associated with a first dynamic token;
   identifying a first static token associated with the entity; and
   converting the first static token to a second dynamic token based on the first static token and the first dynamic token being associated with the entity.

4. The method of claim 1 further comprising determining a data type associated with at least one dynamic token.

5. The method of claim 1 further comprising providing the fillable document template for display, wherein an indication of a data type or an example of the data type associated with a first dynamic token is presented with the fillable document template.

6. One or more non-transitory computer-readable media having a plurality of executable instructions embodied thereon, which, when executed by one or more processors, cause the one or more processors to perform a method for converting documents to finable documents, the method comprising:
   obtaining a set of training documents;
   identifying a group of similar training documents from the set of training documents;
   identifying text differences within the group of similar training documents;
   based on the identified text differences within the group of similar training documents, assigning a dynamic token state indicator to words in the training documents associated with the text differences; and
   training a machine learning model using at least a subset of the group of similar training documents and corresponding dynamic token state indicators to generate a trained machine learning model that predicts token states for text in new documents, each token states comprising a static token that is to be maintained in a fillable document template or a dynamic token that is to be modified in the fillable document template.

7. The one or more non-transitory computer-readable media of claim 6, further comprising assigning a static token state indicator to words not associated with the text differences, wherein the machine learning model is trained using the corresponding dynamic token state indicators and the corresponding static token state indicators.

8. The one or more non-transitory computer-readable media of claim 6, wherein the group of similar training documents is identified using a bag-of-words similarity analysis.

9. The one or more non-transitory computer-readable media of claim 6, wherein the group of similar training documents is identified using a bag-of-words similarity analysis and a word-order similarity analysis.

10. The one or more non-transitory computer-readable media of claim 9, wherein the bag-of-words similarity analysis includes using a MinHash-local sensitive hashing scheme.

11. The one or more non-transitory computer-readable media of claim 9, wherein the word-order similarity analysis includes using a diff-based similarity analysis on a pairwise basis.

12. The one or more non-transitory computer-readable media of claim 6, wherein identifying text differences within the group of similar training documents comprises using a diff-match-patch set of algorithms to analyze pairs of training documents.

13. The one or more non-transitory computer-readable media of claim 6 further comprising:
performing named entity recognition or noun phrase detection;
for an identified entity or noun phrase that corresponds with a word assigned a dynamic token state indicator, assigning the dynamic token state indicator to other words associated with the identified entity or noun phrase.

14. The one or more non-transitory computer-readable media of claim 6, wherein training the machine learning model further comprises using at least a portion of training documents in a second group of similar training documents.

15. The one or more non-transitory computer-readable media of claim 6, wherein the machine learning model is used to predict token state indicators for tokens associated with a new document.

16. A system comprising:
one or more processors; and
one or more memory coupled with the one or more processors, the one or more processors to perform operations comprising:
identifying a first document as similar to a second document;
identifying text differences between the first document and the second document identified as similar to the first document;
for the first document, assigning token state indicators for tokens in the first document based on the identified text differences between the first document and the second document, the token state indicators indicating whether a corresponding token is a static token that is to be maintained in a fillable document template or a dynamic token that is to be modified in the fillable document template, wherein the dynamic token is assigned when a text difference between the first document and the second document is identified in association with the token; and
training, using the tokens in the first document and the corresponding token state indicators, a machine learning model to predict token states for text in new documents.

17. The system of claim 16, wherein the computing system is further caused to identify the first document and the second document are similar based on a bag-of-words similarity analysis and a word-order similarity analysis.

* * * * *

UNITED STATES PATENT AND TRADEMARK OFFICE
CERTIFICATE OF CORRECTION

Page 1 of 1

PATENT NO. : 11,868,714 B2
APPLICATION NO. : 17/682911
DATED : January 9, 2024
INVENTOR(S) : Natwar Modani et al.

It is certified that error appears in the above-identified patent and that said Letters Patent is hereby corrected as shown below:

In the Claims

- Column No. 22, Claim 6, Line no. 34, delete "finable" and insert -- fillable --.

Signed and Sealed this
Twenty-seventh Day of February, 2024

Katherine Kelly Vidal
*Director of the United States Patent and Trademark Office*